United States Patent Office.

MINNIE M. DUBIN, OF PHILADELPHIA, PENNSYLVANIA.

LEAD COMPOUND AND METHOD OF MAKING SAME.

SPECIFICATION forming part of Letters Patent No. 670,198, dated March 19, 1901.

Application filed June 23, 1900. Serial No. 21,283. (No specimens.)

*To all whom it may concern:*

Be it known that I, MINNIE M. DUBIN, a subject of the Emperor of Russia, residing at Philadelphia, county of Philadelphia, and State of Pennsylvania, have invented a new and useful Improvement in Methods of Rendering Lead in Sodium Plumbate Insoluble, of which the following is a full, clear, and exact description.

My invention relates to a novel process of acting upon sodium plumbate, a comparatively rare compound which is incidentally produced in the manufacture of certain other products—as, for example, in the manufacture of nitrite of soda—so as to form an insoluble lead compound.

My invention consists, broadly, in acting upon a solution of sodium plumbate with a sulfid or hydro-sulfid of a metal of the alkaline-earth group, as barium or calcium, the reaction resulting in precipitating the lead as an insoluble double salt of sulfid of lead and oxid of the alkaline-earth metal used.

My invention further consists in the novel product thus obtained.

My invention further consists in the reaction above described when manufacturing nitrite of soda, whereby the disadvantages of using nitric acid (now used to remove the sodium plumbate from solution) are avoided and whereby the by-product formed is an insoluble double salt, readily removable from the solution of nitrite of soda.

In the manufacture of nitrite of soda as now ordinarily carried on this salt is obtained by the fusion of lead and nitrate of soda, the lead reducing the nitrate to nitrite, and the oxid of lead thus formed being of course insoluble, and therefore readily removable from the nitrite-of-soda solution. There is, however, a small amount of caustic soda produced in the reaction, which reacting with the lead oxid produces a sodium plumbate. This is soluble and must be removed from the nitrite of soda.

By my method I am enabled to carry on the manufacture of nitrite of soda at a much less cost, only a small amount of the sulfid being required, and with the production of the insoluble double salt of lead and the alkaline-earth metal, which is readily removable from the solution. I add to the solution of nitrite of soda and plumbate of soda a sulfid or hydro-sulfid of an alkaline earth and obtain the following reaction with the sodium plumbate, supposing barium sulfid to be the specific sulfid chosen:

$$Pb(ONa)_2 + BaS + H_2O = PbS.BaO + 2NaOH,$$

the insoluble by-product being the barium oxy-lead sulfid. Of course I may also use a hydro-sulfid, the reaction being the same in principle, thus—

$$Pb(ONa)_2 + Ba(SH)_2 = PbS.BaO + 2NaOH.$$

Again, I may, if I prefer, use any other metal of the alkaline-earth group, if desired, and the reaction will be the same.

In view of what I have herein set forth it is obvious that I do not desire to limit myself to the exact reactions, the formulæ of which I have given. Further, where in the appended claims I refer to a sulfid of barium or, more broadly, to a sulfid of a metal of the alkaline-earth group I intend that a hydro-sulfid shall be a full equivalent thereof. Moreover, I do not desire to limit myself in all cases to the application of my broad invention to the manufacture of nitrite of soda, as my invention may be used with any solution containing plumbate of soda.

Having now fully described my invention, what I claim, and desire to protect by Letters Patent, is—

1. The process herein set forth of acting upon solutions containing sodium plumbate which consists in combining therewith, sulfid of a metal of the alkaline-earth group.

2. The novel metallic compound herein described being a double sulfid of lead and oxid of a metal of the alkaline-earth group.

3. In the manufacture of nitrite of soda the process herein described of decomposing the sodium plumbate formed from the nitrite of soda, consisting in treating the solution with sulfid of a metal of the alkaline-earth group.

In testimony of which invention I have hereunto set my hand, at Philadelphia, Pennsylvania, on this 22d day of June, 1900.

MINNIE M. DUBIN.

Witnesses:
   MINNIE F. ELLIS,
   J. M. SHINDLER, Jr.